US005603094A

United States Patent [19]
Greear, Jr.

[11] Patent Number: 5,603,094
[45] Date of Patent: Feb. 11, 1997

[54] ANIMAL TRACKING SYSTEM WITH TRANSMITTER ATTACHABLE TO AN ANIMAL'S COLLAR

[76] Inventor: Willie J. Greear, Jr., 38317 S. Williams Cir., Westland, Mich. 48185

[21] Appl. No.: 281,595

[22] Filed: Jul. 28, 1994

[51] Int. Cl.$^6$ .................................................. H04B 7/00
[52] U.S. Cl. ........................... 455/66; 455/100; 455/128; 340/573
[58] Field of Search .................................. 455/100, 127, 455/128, 89, 66; 340/573, 539, 636; 24/308

[56] References Cited

U.S. PATENT DOCUMENTS

| | | | |
|---|---|---|---|
| 2,926,408 | 3/1960 | Smith | 24/308 |
| 4,296,408 | 10/1981 | Neuringer | 340/539 |
| 4,335,682 | 6/1982 | Gonda et al. | 119/29 |
| 4,461,241 | 7/1984 | Ostler | 119/51 R |
| 4,606,073 | 8/1986 | Moore | 455/89 |
| 4,627,107 | 12/1986 | Hohlfeld | 455/11 |
| 4,673,936 | 6/1987 | Kotoh | 342/51 |
| 4,696,054 | 9/1987 | Tsugei et al. | 455/89 |
| 4,802,482 | 2/1989 | Gonda et al. | 119/29 |
| 4,885,800 | 12/1989 | Ragle | 455/66 |
| 5,054,428 | 10/1991 | Farkus | 340/573 |
| 5,115,223 | 5/1992 | Moody | 340/539 |
| 5,241,923 | 9/1993 | Janning | 119/321 |
| 5,289,163 | 2/1994 | Perez et al. | 340/573 |

Primary Examiner—Edward F. Urban

[57] ABSTRACT

A radio tracking system adapted for domestic pets wearing collars. A transmitting unit slips over the animal's collar, and has accommodation for a variety of collar dimensions. A hand held receiver unit indicates strength of signals sent from the transmitting unit through illumination of a plurality of LED lamps. The receiver is pointed in a variety of directions, until a direction is identified which results in the strongest indicated signal, which illuminates more lamps than are illuminated when the receiver is pointed in other directions. This indicates location of the transmitter, and hence the animal, regardless of distance between the transmitter and receiver. Periodic monitoring of signal strength assures that the owner is successfully tracking the animal. Both transmitter and receiver have their own battery power sources and power switches. The transmitter has a battery power level indicator for ascertaining reliability thereof.

1 Claim, 2 Drawing Sheets

ANIMAL TRACKING SYSTEM WITH TRANSMITTER ATTACHABLE TO AN ANIMAL'S COLLAR

BACKGROUND OF THE INVENTION

1. Field of the Invention

The present invention relates to an animal tracking system which includes a radio transmitter mounted on the animal's collar and a radio receiver. The receiver is held by the owner of the animal, and indicates location of the transmitter by directional responsiveness.

2. Description of the Prior Art

Radio transmitters and receivers have long been employed to signal the location of one party, or object, to a second party. This is exemplified by U.S. Pat. No. 4,885,800, issued to Clyde M. Ragle on Dec. 5, 1989. Ragle places a miniature transmitter in an arrow. Game struck by the arrow may try to escape after being hit by the arrow, but the hunter can track the animal by monitoring the transmitter by a hand held receiver. The radio transmitter is housed in a tube behind the arrowhead and ahead of the arrow main shaft. Thus, even if the arrow is broken when an animal struck by the same flees through rugged terrain or dense vegetation, the transmitter will remain with the animal.

U.S. Pat. No. 4,296,408, issued on Oct. 20, 1981, to Neuringer; U.S. Pat. No. 4,606,073, issued on Aug. 12, 1986 to Moore; U.S. Pat. No. 4,627,107, issued on Dec. 2, 1986 to Hohlfeld et al.; U.S. Pat. No. 4,673,936, issued on Jun. 16, 1987 to Kotoh; and U.S. Pat. No. 4,696,054, issued on Sep. 22, 1987 to Tsugei et al. illustrate in greater detail radio technology which can be employed in the invention which is the subject of this application.

Radio control of animals, attaching a radio component to the collar, is known. U.S. Pat. Nos. 4,335,682, issued to Gonda and Vancza, Jr. on Jun. 22, 1982, and U.S. Pat. No. 4,802,482, issued to Gonda and Farkas on Feb. 7, 1989, both disclose a radio operated device for training an animal by electric shocks. A receiver located on the animal's collar controls the shock emitting apparatus, so that a human operator can apply a shock when desired.

U.S. Pat. No. 4,967,696, issued to Samuel Tobias on Nov. 6, 1990, discloses a radio receiver mounted to the collar. The receiver receives and reproduces audible, verbal commands to the animal.

The closest known apparatus having a generally similar configuration to the novel transmitter, and which is normally attached to a band or strap is a wristwatch. Wristwatches generally have flat housings, and include two rods rigidly attached to the housing to engage the band. These rods are located on opposite sides of the housing. The band has two loops, one for encircling each band. This is the usual arrangement for watches regardless of whether the band is made in one piece or in two pieces which mutually attach, as by clasps or buckles.

None of these patents and known devices, taken either singly or in combination, is seen to describe the instant invention as claimed.

SUMMARY OF THE INVENTION

The present invention discloses a system for adapting a radio transmitter for use in tracking a pet or other animal provided with a collar. The transmitter is attached to the collar, contained within a relatively flat housing, so that it will not be bulky and objectionable to the animal. This will assist in causing the animal to accept the transmitter.

Unlike wrist watches, the transmitter housing of the present invention is intended to be readily installed on an animal collar not originally designed therewith. Therefore, the collar lacks the loops present in a watch band. Accommodating structure is provided on the housing so that the transmitter can be slipped over and removed from a collar.

It is also important to keep the transmitter in a position on the collar which is not easily snagged as the animal passes through dense vegetation and the like, and which is not so obtrusive as to be objectionable to the animal. The novel housing has loops which cooperate with a collar to maintain the housing in a suitable position. These loops are so arranged so that they accommodate a variety of material thicknesses, as the precise dimensions of a collar cannot be predicted.

The associated radio receiving unit includes features which are particularly suited to the purpose. A display indicates the direction of the transmitter with respect to the receiver by signalling the strength of the signal. The receiver is directed or aimed in various directions until a direction is identified which results in the strongest signal. The animal owner then proceeds in this direction, periodically rechecking signal strength. Thus, although most animals can outpace a human on most terrain, the owner is apprised of the proper direction for following the animal.

A preferred display for indicating signal strength includes a series of light emitting diode type (LED) lamps. Stronger signals illuminate a greater number of lamps.

Like the transmitting unit, the receiving unit is battery powered, and includes an on-off switch. Both units include accommodation for identification, which may include a label. The transmitter includes a battery power level indicator, so that the owner will know that the device is reliable.

Accordingly, it is a principal object of the invention to provide a radio transmitter receiver system for tracking an animal, including a transmitter unit located on the animal, and a hand held receiver unit.

It is another object of the invention to attach the transmitter removably to the animal collar.

It is a further object of the invention that the transmitter be unobtrusively positioned upon the collar.

It is an additional object of the invention that the collar engaging portion of the transmitter housing accommodate collars of varying dimensions.

It is again an object of the invention to provide the receiver unit with a signal strength indicator.

Still a further object of the invention is to provide indicia upon the receiver unit pointing in the direction of the transmitter.

Another object of the invention is to provide the transmitter and receiver units with battery cells and power switches.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a perspective detail view of an alternative embodiment of the transmitter housing.

Similar reference characters denote corresponding features consistently throughout the attached drawings.

DETAILED DESCRIPTION OF THE PREFERRED EMBODIMENTS

Figure 1:
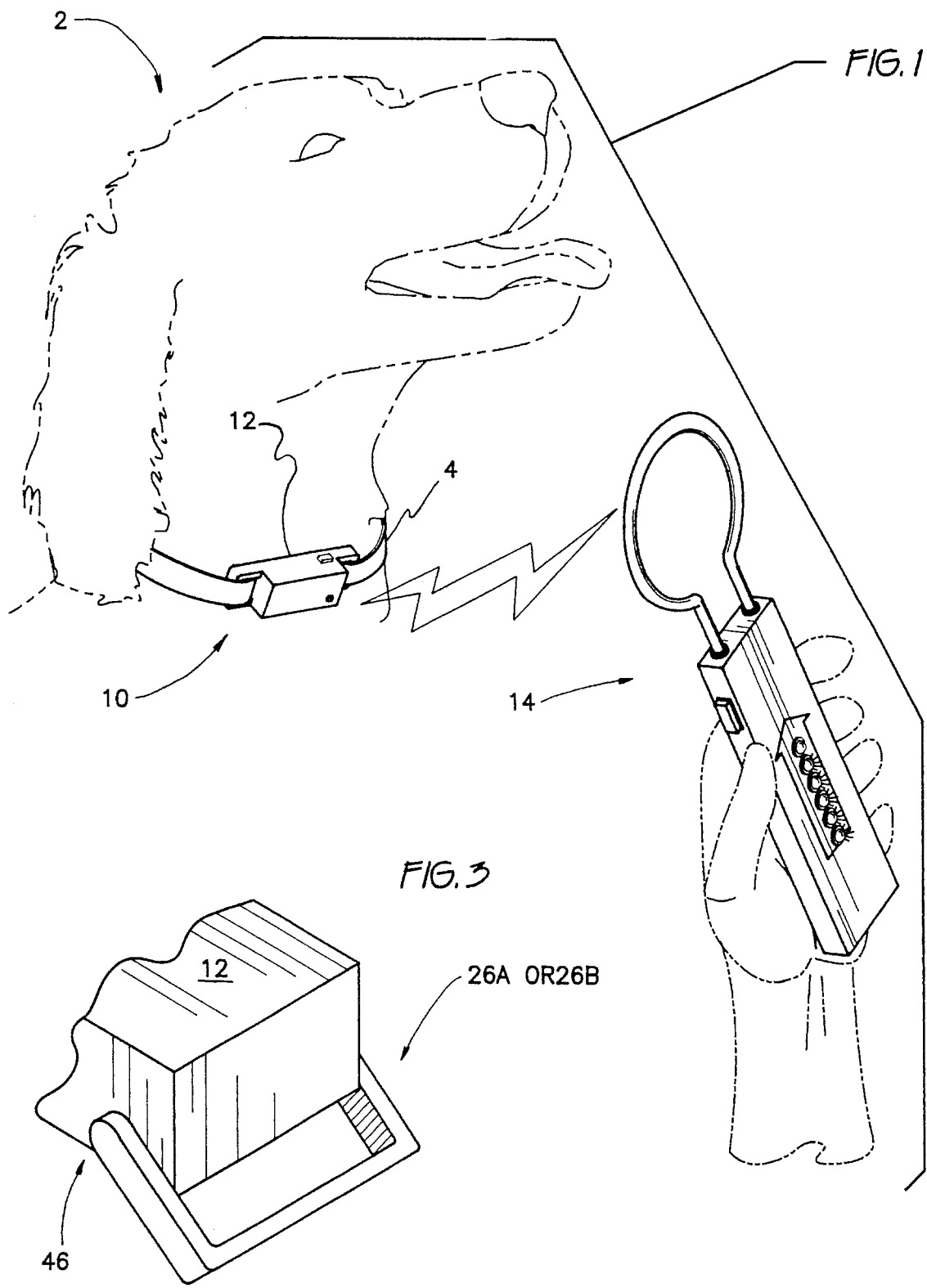
FIG. 1 is an environmental, diagrammatic, perspective view of the radio transmitter and receiver units.

The overall concept of the present invention is best understood with reference to FIG. 1. An animal 2 is normally provided with a collar 4 for mounting an identification tag, proof of required medical vaccinations, and the like (not shown). A radio transmitting unit 10 contained within a housing 12 is slipped over this collar, and constantly transmits signals of predetermined characteristics. Such characteristics will include frequency, and may include alternating periods of transmission and quiescence. The pattern of transmission may include bursts or pulses of signals sufficiently distinctive as to establish positive identification of a particular transmitter. This will prevent confusion with transmitters of other types, or similar transmitters placed on other animals.

The animal's owner, when desiring to locate an unconfined animal 2, holds a radio receiving unit 14, which is tunable to the predetermined frequency of transmitting unit 10. When switched on, receiving unit 14 receives signals from transmitting unit 10, and emits an audible or visible signal or both in response thereto.

Figure 2:
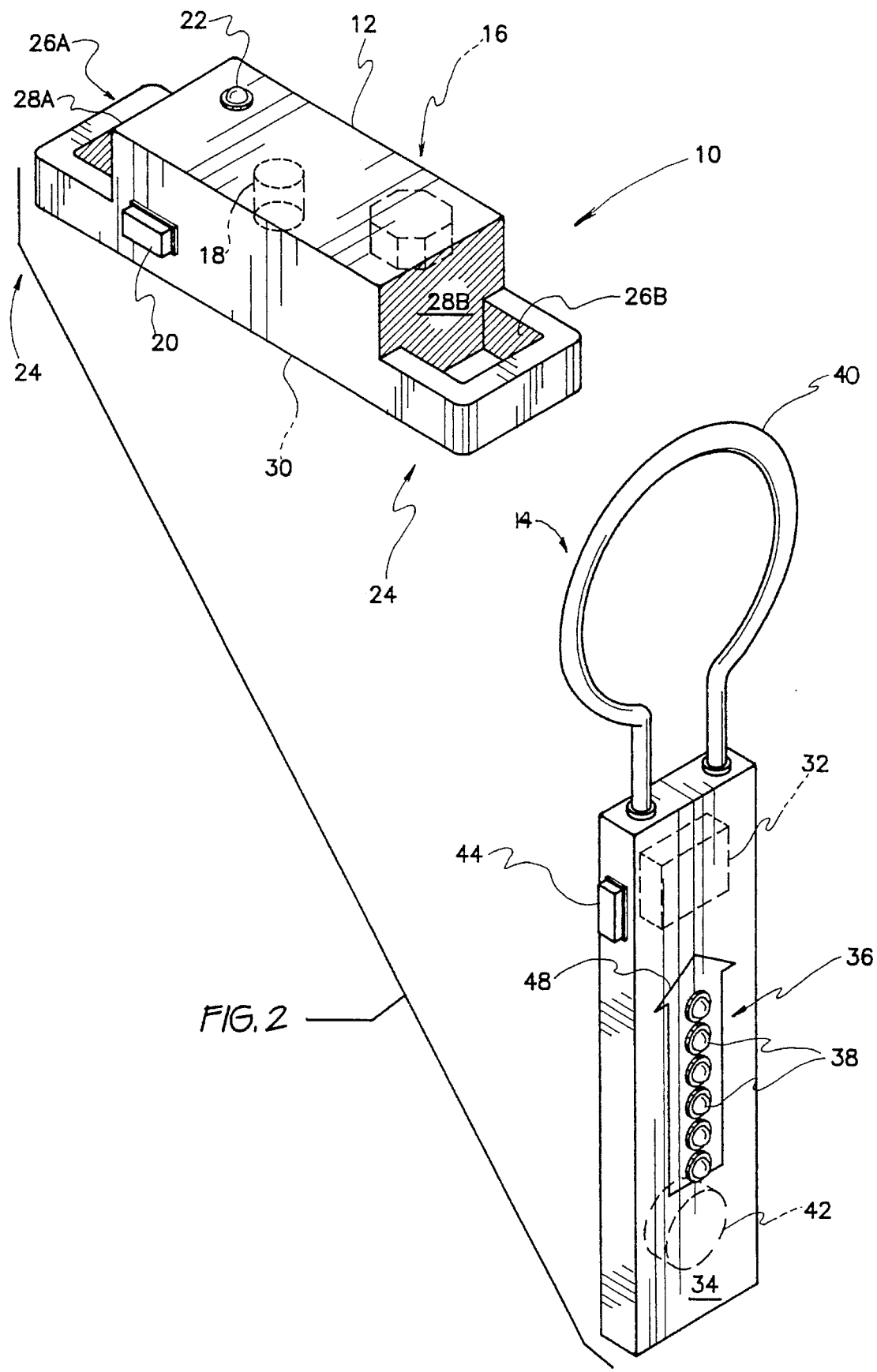
FIG. 2 is a diagrammatic, perspective detail view of the transmitter and receiver, drawn to enlarged scale.

Turning now to FIG. 2, transmitting unit 10 and receiving unit 14 will be described in greater detail. Transmitting unit 10 includes a miniature transmitter 16, a battery cell power source 18 powering transmitter 16, and an externally accessible power switch 20 controlling power to transmitter 16. Preferably, transmitting unit 10 includes a battery power level indicator 22 connected to power source 18 and located exteriorly of housing 12.

Housing 12 is designed to cooperate with any collar 4, which may be of varying thickness and width dimensions. Housing 12 therefore includes attachment apparatus 24 for engaging collar 4, comprising an inlet 26A located at one side 28A of housing 12, and an outlet 26B located at an opposite side 28B of housing 12. Of course, inlet 26A and outlet 26B may be defined by a single, elongated structure (not shown), or may comprise two separate rigid loop members.

In either case, collar 4 is passed through inlet 26A, extended along the rear surface 30 of housing 12, and then is passed through outlet 26B. Since the direction of installing collar 4 is unimportant, designation of inlet and outlet is arbitrary, and the two are structurally and functionally equivalent.

Receiving unit 14 includes a minature receiver 32 tunable to the frequency of the constant signal from transmitting unit 10. The face 34 of receiving unit includes a signal strength indicator 36 comprising a plurality of individually illuminable LED lamps 38. Strength indicator 36 is arranged to indicate signal strength by illuminating a relatively great number of LED lamps 38 by a relatively strong signal, as would be received when antenna 40 is aligned with transmitting unit 10.

When receiving unit 14 is held such that antenna 40 is pointed away from transmitting unit 10, the progressively weaker signal illuminates progressively fewer LED lamps 38. The technology to accomplish this is well known, as in the field of hand held radar detectors. The difference is that in the present invention, stronger signals indicate alignment with the source of the signal, and therefore, an appropriate direction for following the source. Radar detectors produce an indication of proximity to the source of their respective signals. Of course, proximity may also influence signals, but at any given proximity, alignment with transmitting unit 10 will determine a maximum indication possible for that given proximity.

Receiving unit 14 preferably includes indicia 48 indicating the direction from which antenna 40 receives the strongest signal, and thus, the direction of transmitting unit 10. The term "indicia" will be understood to include arrow shaped impressions, either of intaglio or relief types, formed in receiving unit 14.

Receiving unit 14 is also powered by a battery cell power source 42, connected to receiver 32 and strength indicator 36. A second power switch 44 disconnects power source 42 from both receiver 32 and strength indicator 36, to conserve power.

To further improve accommodation of collars of different thickness dimensions, and referring now to FIG. 3, inlet 26A and outlet 26B each comprise a rigid loop pivotally mounted to housing 12, as indicated at 46. This arrangement enables housing 12 to be adjusted longitudinally for collars of different thickness dimensions. This entails drawing collar 4 (see FIG. 1) reasonably tightly against the animal's body, while causing the loops to assume a position wherein they are as coplanar with the rear surface 30 (see FIG. 2) of housing 12 as is feasible.

It is to be understood that the present invention is not limited to the embodiments described above, but encompasses any and all embodiments within the scope of the following claims.

I claim:

1. A tracking system for indicating the direction of an animal fitted with a collar with respect to a person seeking the animal, comprising:

a radio frequency transmitting unit having means for attachment to the animal's collar, having a housing containing a miniature radio frequency transmitter transmitting a constant signal of predetermined transmission characteristics, a battery cell power source connected to said transmitter, an external battery power level indicator operably connected to said battery cell power source, and a externally accessible power switch controlling power to said transmitter and to said power level indicator, said means for attachment to the animal's collar including means defining an inlet located at one end of said housing and defining an outlet located at an opposite end of said housing with respect to said outlet, each of said inlet and said outlet comprising a rigid U-shaped loop having means for pivotally mounting the ends of said rigid U-shaped loops to the sides of said housing, wherein said means for pivotally mounting rotates said inlet and said outlet longitudinally thereby adjusting for collars of different thickness dimensions; and a radio receiving unit including a receiver having means for tuning to the frequency of said constant signal, a signal strength indicator responsive to reception of said constant signal and also responsive to the strength of said constant signal, said signal strength indicator comprising a plurality of LED lamps and means for individually illuminating said LED lamps, said signal strength indicator arranged to indicate signal strength by illuminating a relatively great number of said LED lamps by a relatively strong signal, and illuminating progressively fewer said LED lamps by progressively weaker signals, said receiving unit comprising a second battery cell power source operably connected to said receiver and to said signal strength indicator, and a second externally accessible power switch controlling power to said receiver and to said signal strength indicator, said receiving unit further including indicia indicating the direction resulting in reception of the strongest signal, and hence the direction of said transmitting unit.

\* \* \* \* \*